United States Patent
Lewellen et al.

(10) Patent No.: US 7,956,331 B2
(45) Date of Patent: Jun. 7, 2011

(54) SCINTILLATION DETECTOR FOR POSITRON EMISSION TOMOGRAPHY

(75) Inventors: Thomas Lewellen, Port Ludow, WA (US); Robert Miyaoka, Shoreline, WA (US); Abdelmounaime Faouzi Zerrouk, Singapore (SG)

(73) Assignee: Zecotek Imaging Systems Pte. Ltd, Singapore (SG)

( * ) Notice: Subject to any disclaimer, the term of this patent is extended or adjusted under 35 U.S.C. 154(b) by 134 days.

(21) Appl. No.: 12/259,270

(22) Filed: Oct. 27, 2008

(65) Prior Publication Data

US 2009/0224164 A1    Sep. 10, 2009

Related U.S. Application Data

(60) Provisional application No. 60/983,013, filed on Oct. 26, 2007.

(51) Int. Cl.
*G01T 1/20* (2006.01)
(52) U.S. Cl. .................................. 250/370.11
(58) Field of Classification Search .............. 250/370.11
See application file for complete search history.

(56) References Cited

U.S. PATENT DOCUMENTS

| | | | |
|---|---|---|---|
| 5,576,546 A | 11/1996 | Gagnon | |
| 7,378,659 B2 | 5/2008 | Burr et al. | |
| 2003/0105397 A1 | 6/2003 | Tumer et al. | |
| 2004/0232342 A1* | 11/2004 | Aykac et al. | 250/367 |
| 2005/0113667 A1 | 5/2005 | Schlyer et al. | |
| 2005/0230626 A1 | 10/2005 | Crosetto | |
| 2005/0285042 A1 | 12/2005 | Joung | |
| 2006/0027754 A1 | 2/2006 | Ramsden et al. | |
| 2006/0106306 A1* | 5/2006 | Essner et al. | 600/436 |
| 2006/0192128 A1 | 8/2006 | Benlloch Bavciera et al. | |
| 2006/0214110 A1 | 9/2006 | Kojima et al. | |
| 2006/0219928 A1* | 10/2006 | Derenzo et al. | 250/370.11 |
| 2006/0243913 A1 | 11/2006 | Overdick et al. | |
| 2006/0261279 A1 | 11/2006 | Crosetto | |

OTHER PUBLICATIONS

Gomi et al. Development of multipixel photon counters, Oct. 29-Nov. 4, 2006 IEEE Nuclear Science Symposium Conference Record, pp. 1105-1111.*
Herbert et al. The Silicon Photomultiplier for application to high-resolution Positron Emission Tomography, Nuclear Instruments and Methods in Physics Research Section A, vol. 573, No. 1-2 (Apr. 2007), pp. 84-87.*

(Continued)

*Primary Examiner* — David P Porta
*Assistant Examiner* — Shun Lee
(74) *Attorney, Agent, or Firm* — Thomas E. Loop; Graybeal Jackson LLP

(57) ABSTRACT

The invention disclosed herein is directed to scintillation detectors capable of detecting the position or depth of gamma photon interactions occurring within a scintillator, thereby improving the resolution of ring based positron emission tomography (PET) imaging systems. In one embodiment, the invention is directed to a scintillation detector that comprises at least one pair of side-by-side conjunct scintillation crystal bars having a shared interface between, and a solid-state semiconductor photodetector optically coupled to each output window of each individual scintillation crystal bar. The solid-state semiconductor photodetector includes an array of discrete sensitive areas disposed across a top surface of a common substrate, wherein each sensitive area contains an array of discrete micro-pixelated avalanche photodiodes, and wherein the output window of each scintillation crystal bar is optically coupled to each respective sensitive area in a one-on-one relationship.

14 Claims, 2 Drawing Sheets

OTHER PUBLICATIONS

Miyaoka et al. "Design of a Depth of Interaction (DOI) PET Detecter Module," IEEE Transactions on Nuclear Science, Jun. 1998, pp. 1069-1073, vol. 45, No. 3.

Lee et al. "Detector Characteristics of the Micro Crystal Element Scanner (MiCES)," IEEE Transactions on Nuclear Science, Oct. 2005, pp. 1428-1433, vol. 52, No. 5.

Lewellen et al. "DMice—A Depth-of-Interaction Detector Design for PET Scanners," Nuclear Science Symposium Conference Record, 2004 IEEE, Oct. 2004, pp. 2388-2392, vol. 4.

Moses et al. "Factors Influencing Timing Resolution in a Commercial LSO PET Camera," IEEE Transactions on Nuclear Science, Feb. 2006, pp. 78-85, vol. 53, No. 1.

Lewellen et al. "Initial Evaluation of the Scintillator LFS for Positron Emission Tomograph Applications," Nuclear Science Symposium Conference Record, 2004 IEEE, Oct. 2004, pp. 2915-2918, vol. 5.

Miyaoka et al. "Performance Characteristics of a Second Generation Micro Crystal Element (MiCE2) Detector," Nuclear Science Symposium Conference Record, 2001 IEEE, Nov. 2001, pp. 1124-1127, vol. 2.

Lee et al. "Pragmatic Fully 3D Image Reconstruction for the MiCES Mouse Imaging PET Scanner," Physics in Medicine and Biology, Sep. 2004, pp. 4563-4578, vol. 49.

Moisan et al. "A Public Domain Platform to Model Scintillation Counters for Gamma-Ray Imaging Applications," SPIE, Jul. 1997, pp. 21-29, vol. 3115.

Miyaoka et al. "Recent Progress in the Development of a Micro Crystal Element (MiCE) PET System," Nuclear Science Symposium Conference Record, 2002 IEEE, Nov. 2002, pp. 1287-1291, vol. 2.

* cited by examiner

SCINTILLATION DETECTOR FOR POSITRON EMISSION TOMOGRAPHY

CROSS-REFERENCE TO RELATED APPLICATIONS

This application claims the benefit of U.S. Provisional Application No. 60/983,013 filed on Oct. 26, 2007, which application is incorporated herein by reference in its entirety for all purposes.

FEDERAL FUNDING STATEMENT

This invention was made with government support under R01EB002117 and CA088194 (NCI) awarded by National Institutes of Health (NIH). The government has certain rights in the invention.

TECHNICAL FIELD

The present invention relates generally to nuclear medicine imaging devices and, more specifically, to scintillation detectors for detecting the position or depth of gamma photon interactions occurring within a scintillator, thereby improving the resolution of ring based positron emission tomography (PET) imaging systems.

BACKGROUND OF THE INVENTION

Positron emission tomography (PET) is a nuclear medicine imaging technique that produces a three-dimensional image or map of functional processes in a living organism. A typical PET imaging system detects pairs of gamma rays emitted indirectly by a positron-emitting radionuclide (tracer), which is introduced into the body on a biologically active molecule such as, for example, fluorodeoxyglucose. After enough time has elapsed for the tracer to distribute and concentrate within certain tissues, the patient is scanned to reveal the tracer's whereabouts. When a positron is emitted by the tracer it travels only a few millimetres before it annihilates with an electron. The annihilation event produces a pair of 511 KeV gamma photons that travel in nearly opposite directions (180°±0.23°) from each other. These photons are absorbed by a circumferential ring of scintillators that create bursts of visible light photons that, in turn, are detected by photodetectors. PET imaging systems are thus based on coincident gamma photon detection; photons not arriving in pairs being ignored. Because each pair of detected gamma photons travels in nearly a straight line (called the line of response (LOR)), the tracer's location may be determined by identifying LOR intersections ("sweet spots").

The spatial resolution of these sweet spots degrades significantly toward the periphery of the field of view (FOV), and is characteristic of all conventional ring based PET imaging systems. This non-symmetric broadening of the tracer point source is a result of assigning detected interaction events to the wrong LOR (see FIG. 1). Thus, and in order to improve peripheral image resolution, the position or depth of gamma photon interactions occurring within the scintillators (of the ring of scintillators) needs to be accurately determined. PET imaging systems that provide depth of interaction (DOI) information can correctly position interaction events thereby resulting in more uniform resolution throughout the FOV.

A number of methods for extracting DOI information from a PET detector module have been proposed; however, conventional PET imaging systems do not provide adequate DOI information. A drawback to a number of the proposed systems is the requirement for additional detector electronics. In one very promising approach, however, light sharing along the long length of a pair of optically coupled scintillation crystals is used to extract DOI information based on the ratio of light outputs from each of the paired crystals. More specifically, DOI information may be extracted from the ratio of light collected between neighbouring crystals (A and B) of a crystal pair using simple Anger type logic [A/(A+B)]. Although initial work in this area has been promising, practical implementation for small cross section crystals and optimization of the light sharing between crystals has been limited due, in large part, to significant light sharing in the glass envelope of conventional position sensitive photomultiplier tubes (PMTs). (R. S. Miyaoka, T. K. Lewellen, H. Yu, D. L. McDaniel, *Design of a Depth of Interaction (DOI) PET Detector Module*, IEEE Trans. Nucl. Sci., Vol. 45, No. 3, June 1998 pp: 1069-1073; T. K. Lewellen, R. S. Miyaoka, *DMice—a depth-of-interaction detector design for PET scanners*, Proceedings of the IEEE Nuclear Science Symposium and Medical Imaging Conference, Rome (2004): 2388-92).

Accordingly, there is a need in the art for new and improved scintillation detectors capable of detecting the position or depth of gamma photon interactions occurring within a scintillator. The present invention fulfils these needs and provides for further related advantages.

SUMMARY OF THE INVENTION

The present invention relates to scintillation detectors capable of detecting the position or depth of gamma photon interactions occurring within a scintillator. In one embodiment, the invention is directed to a scintillation detector that comprises: at least one pair of conjunct scintillation crystal bars, wherein each pair of conjunct scintillation crystal bars is composed of two individual optically coupled scintillation crystal bars positioned in a side-by-side relationship. Each pair of conjunct scintillation crystal bars includes (i) an optical interface layer positioned between the two scintillation crystal bars for light sharing between one scintillation crystal bar and the other, and (ii) an opaque layer positioned between the two scintillation crystal bars for restricting light sharing between one scintillation crystal bar and the other. The optical interface layer and the opaque layer are generally contiguous with each other. Each individual scintillation crystal bar includes proximal and distal ends, wherein each proximal end includes an output window.

The scintillation detector also comprises a solid-state semiconductor photodetector optically coupled to each output window of each individual scintillation crystal bar. The solid-state semiconductor photodetector includes an array of discrete sensitive areas disposed across a top surface of a common substrate. Each sensitive area contains an array of discrete micro-pixelated avalanche photodiodes. The output window of each scintillation crystal bar is optically coupled to each respective sensitive area in a one-on-one relationship.

These and other aspects of the present invention will become more evident upon reference to the following detailed description and attached drawings. It is to be understood, however, that various changes, alterations, and substitutions may be made to the specific embodiments disclosed herein without departing from their essential spirit and scope. In addition, it is expressly provided that all of the various references cited herein are incorporated herein by reference in their entireties for all purposes.

DETAILED DESCRIPTION OF INVENTION

Figure 1:
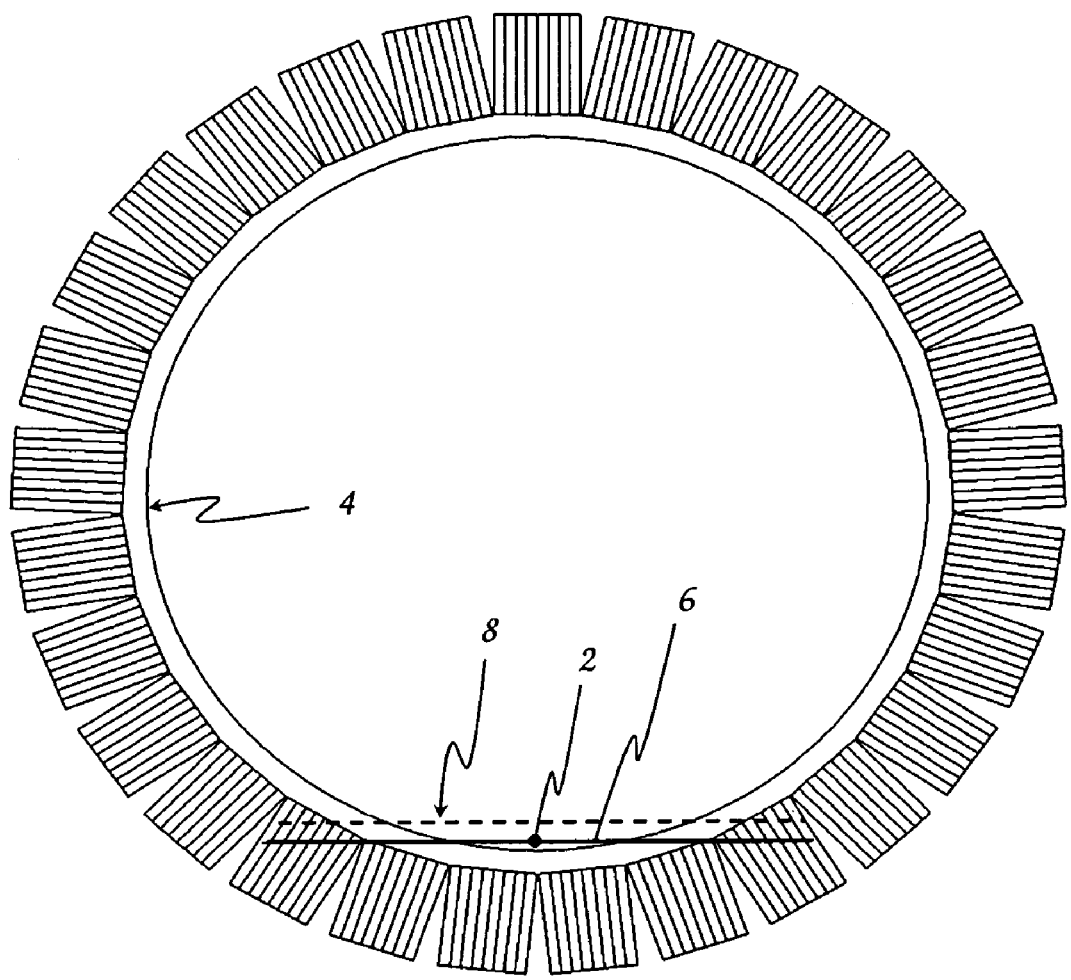
FIG. 1 illustrates a side view of a ring of scintillators (prior art) associated with a conventional PET imaging system and shows an electron-positron annihilation event 2 occurring near the periphery of the field of view (FOV) boundary 4, as well as the actual line of response (LOR) 6 and misplaced LOR 8 (dashed line) resulting from the coincident gamma photon emission.
Figure 2A:
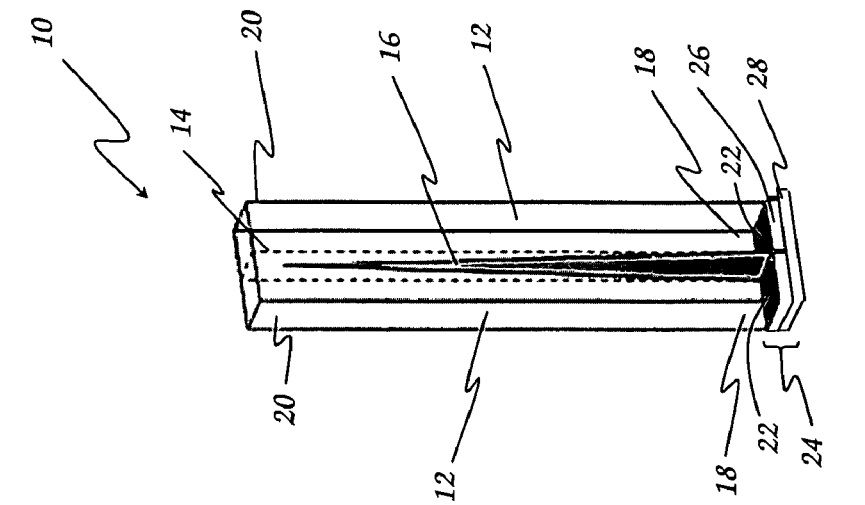
FIG. 2A illustrates a first side view of a pair of side-by-side conjunct scintillation crystal bars optically coupled to a solid-state semiconductor photodetector in accordance with an embodiment of the present invention.

The present invention is directed to scintillation detectors capable of detecting the position or depth of gamma photon interactions occurring within a scintillator, thereby improving the resolution of ring based positron emission tomography (PET) imaging systems. In one embodiment and with reference to FIGS. 2A-C, the present invention is directed to a scintillation detector 10 for detecting the position or depth of gamma photon interactions that comprises at least one pair of conjunct scintillation crystal elements or bars 12. Each pair of conjunct scintillation crystal bars 12 includes (i) an optical interface layer 14 positioned between the two discrete scintillation crystal bars 12 for light sharing between one scintillation crystal bar and the other, and (ii) an opaque layer 16 positioned between the two discrete scintillation crystal bars 12 for restricting light sharing between one scintillation crystal bar and the other. The optical interface layer 14 and the opaque layer 16 are generally contiguous with each other. In addition, the optical interface layer 14 may be non-uniform, whereas the opaque layer 16 may be reflective. Each individual scintillation crystal bar includes proximal and distal ends 18, 20, wherein each proximal end 18 includes an output window 22.

Each individual scintillation crystal bar 12 is preferably selected from the group consisting of a LFS crystal, a LSO crystal, a LYSO crystal, a GSO crystal, a LGSO crystal, a LuAP crystal, a BGO crystal, a NaI crystal, and a PbWO$_4$ crystal. The individual scintillation crystal bars 12, however, are preferably the same and comprise LFS crystal (available from Zecotek Photonics Inc.). Each individual scintillation crystal bar 12 also preferably has a decay time ranging from about 20 ns to about 50 ns, and a density of greater than 6 g/cm$^3$.

The scintillation detector 10 of the present invention also comprises a solid-state semiconductor photodetector 24 (available from Zecotek Photonics Inc.) optically coupled to each output window 22 of each individual scintillation crystal bar 12. Unlike conventional position sensitive photomultiplier tubes (PMTs) known in the art, the solid-state semiconductor photodetector 24 of the present invention includes of an array of discrete sensitive areas 26 disposed across a top surface of a common substrate 28 such as, for example, crystalline or amorphous silicon. The array of discrete sensitive areas 26 defines a generally flat surface. Each sensitive area 26 further contains an array of discrete micro-pixelated avalanche photodiodes (not shown), wherein each array of micro-pixelated avalanche photodiodes is preferably embedded within each discrete sensitive area 26. The pixel (independent p-n junctions) density of each sensitive area 26 is preferably about or greater than 520 pixel/mm$^2$, and more preferably is about or greater than 1,100 pixel/mm$^2$, and even more preferably is about or greater than 15,000 pixel/mm$^2$, and even still more preferably is about or greater than 40,000 pixel/mm$^2$. As shown, the output window 22 of each scintillation crystal bar 12 is optically coupled to each respective sensitive area 26 in a one-on-one relationship (in contradistinction to the many-on-one coupling arrangement known in the art).

Figure 2B:
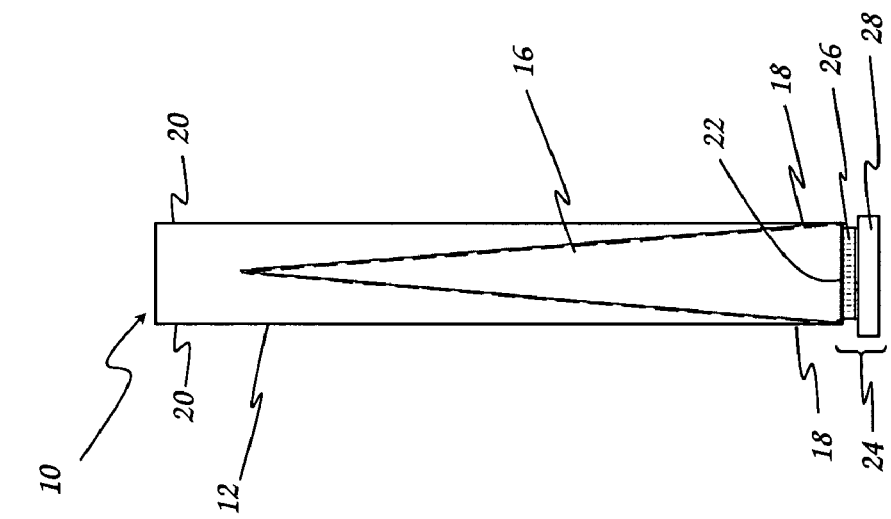
FIG. 2B is a second side view of the pair of side-by-side conjunct scintillation crystal bars illustrated in FIG. 2A.
Figure 2C:
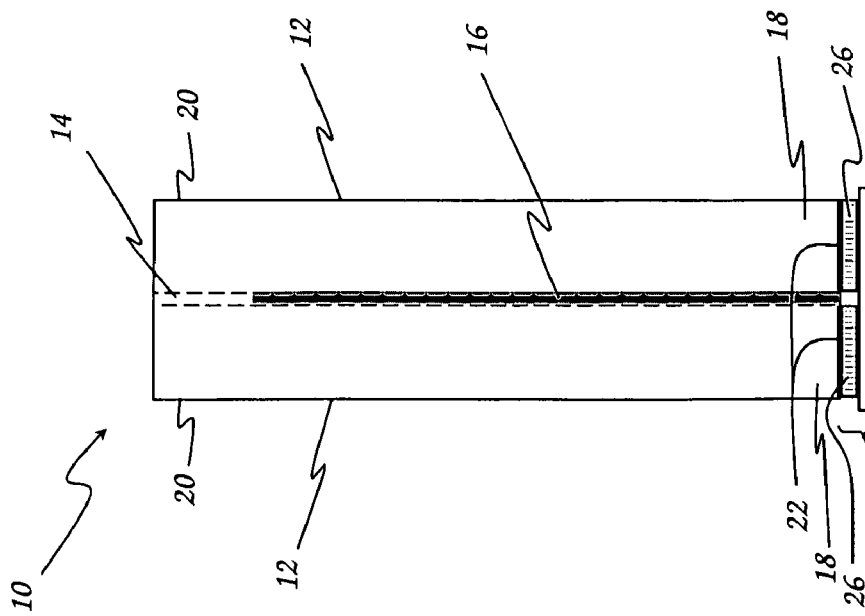
FIG. 2C is a side perspective view of the pair of side-by-side conjunct scintillation crystal bars illustrated in FIGS. 2A and 2B.

As best shown in FIGS. 2B and 2C, the opaque layer 16 may be a triangular shaped reflector having a base portion positioned adjacent to the proximal ends 18 of each individual scintillation crystal bar 12. In other embodiments, the opaque layer 16 may be rectangular or trapezoidal shaped reflector (not shown). In still further embodiments, the opaque layer 16 is a polymer reflective film or a reflective foil. In this configuration, there is essentially no light near the solid-state semiconductor photodetector 24 and full sharing near the front or distal ends 20 of the scintillation crystals 12.

For purposes of illustration and not limitation, the following example more specifically discloses certain exemplary test materials, methods, and results associated with a scintillation detector made in accordance with the present invention.

EXAMPLE

Zecotek Photonics Inc. has developed three different generations of micro-pixelated avalanche photodiodes (MAPDs), as well as several different variants of their LFS scintillation crystal (Lewellen, T. K., M. Janes, R. S. Miyaoka, and F. Zerrouk, *Initial Evaluation of the Scintillator LFS for Positron Emission Tomography Applications*, Proceedings of the IEEE Nuclear Science Syposium and Medical Imaging Conference, Rome, (2004): 2915-18). The characteristics of Zecotek's three prototype MAPDs are listed in Table I. Except as noted, the data associated with this Example was taken from MAPD Type 3 devices optically coupled to LFS Type 3 crystals. Zecotek also provided us with some prototype MAPD Type 3 arrays (two 1×2 devices and a 2×2 device), both using 1.1×1.1 mm active cells. Measurements of the current-voltage curves of single devices (or elements in the arrays) were performed. Energy spectra and preliminary timing measurements of single crystal elements were also performed.

TABLE I

Basic parameters of three types of Zecotek prototype MAPDs.

| MAPD type | Sensitive area (mm) | Pixel density (pixels/mm$^2$) | Typical bias (VDC) | MFR specified gain |
|---|---|---|---|---|
| 1 | 1.82 × 1.82 | ~950 | 81-83 | $10^5$ |
| 2 | 1.08 × 1.08 | ~900 | 58-59 | $10^6$ |
| 3 | 3.0 × 3.0 | ~10,000 | 136-142 | $2 \times 10^4$ |

For purposes of testing, the devices were placed in a light tight box with the bias circuit placed close to the MAPD(s) under test.

For a first series of experiments, we used 2.2×2.2 mm cross-section crystals. In a similar fashion to our early work, we looked at a variety of triangle and square patterns for the reflector between the crystal pairs. We focused on triangular shapes with rectangular blocks near the MAPD. Combinations considered included using paint or a 3M mirror film for the shared crystal surfaces, white paint or a 3M mirror film on the non-shared long surfaces, and combinations of black and white paint as well as a 3M mirror film on the surface opposite the MAPD. DETECT computer simulation software (Moisan, C., Hoskinson, E. M., Levin, A., and Vozza, D,

*Public Domain Platform to Model Scintillation Counters for Gamma-Ray Imaging Applications*, SPIE 3115 (1997): 21-29) was used for various light transport simulations. The specific version used was the DETECT 2000 code which has provisions for a semi-empirical model of surface roughness (UNIFIED surface). For the data presented here, we used the standard surfaces in DETECT. Specifically, we used the PAINT surface to model using white paint or TFE Teflon, and METAL for use of 3M mirror film.

For initial experiments with crystal pairs on the prototype MAPD arrays, we used 2.2×2.2×20 mm LFS-3 crystals. The crystal were mounted on a 1×2 MAPD array and visually positioned. With the current array pitch and the thickness of the reflector materials, the crystals were visually well centered over the array of active elements. Table II summarizes the basic measurement results. Re-coupling a given MAPD crystal pair (5 repeats) showed a ~11% error. These re-coupling errors probably reflect the slightly curved optical surface of the prototype MAPDs which results in a non-uniform thickness of the coupling compound. The manufacturer assures us that the production MAPD devices will have a flat optical surface for coupling.

TABLE II

Repeated test results of MAPD

| Parameter | Type 1 MAPD | Type 3 MAPD | R2548 PMT (900 VDC) |
|---|---|---|---|
| Relative gain, 250 ns shaping | 3.9 | 1.7 | 1.4 |
| Energy resolution, 250 ns shaping | 14.6% | 11% | 14% |

A wide variety of reflector combinations were investigated. The best performance for the shared interface reflector was obtained with the basic geometry of an isosceles triangle and a metallic reflector on the unshared surfaces. In general, we found the use of the metallic reflector on the unshared long surfaces was significantly better than a white reflector.

Our earlier work with our dMiCE DOI concept (Lewellen, T. K., M. Janes, and R. S. Miyaoka, *Dmice—a Depth-of-Interaction Detector Design for Pet Scanners*, Proceedings of the IEEE Nuclear Science Symposium and Medical Imaging Conference, Rome, (2004): 2388-92; Miyaoka, R. S., Lewellen, T. K., Yu, H., and McDaniel, D. L., *Design of a Depth of Interaction (DOI) Pet Detector Module*, IEEE Trans. Nucl. Sci. 45, no. 3 (1998): 1069-73) was promising but limited by problems with optimization of the light sharing schemes and dealing with the decoding of the light response function associated with the many-on-one coupling scheme of the shared crystals in the array. Various position sensitive PMTs did not provide us an option for one-on-one coupling for the crystal sizes we wished to utilize for pre-clinical imaging systems. The performance we observed with the prototype MAPD devices had the needed energy resolution and linearity, as well as adequate timing for our dMiCE detector designs. The expected improvements in the devices (e.g., improved timing resolution and MAPD arrays that will support arrays of dMiCE crystal pairs) will provide us with the needed one-on-one coupling to realize construction of full dMiCE detector systems.

The extension of our earlier simulation work to begin looking at changes in the unshared surface treatments indicates that we can trade off total light collection to improve the DOI decoding. However, the increase in variance for any individual measurement as we improve the DOI ratio parameter used in the current simulations presents us with a non-trivial optimization problem. Further, the simulation data does not include Compton scattering in the crystal array. With our one-on-one coupling scheme (either single ended or dual ended) and small cross section crystals, a Compton scatter event followed by a Photoelectric event will generally occur in different crystals. For our single-ended dMiCE design concept, small cross section crystals also means that Compton-Photoelectric events are generally not going to occur within a single paired crystal element, but will occur between crystal pair elements (signals from four MAPD elements).

We are now taking data with crystal pairs based on the reflector designs from our simulations. In parallel, we are working on an estimation algorithm that will take into account the data from each sensor in the array and the geometry of the scanner to determine the point of first interaction within the detector array. That algorithm will need to take into account: 1) the fact that the total amount of light extracted from a crystal pair is DOI dependent; 2) the experimentally determined variance in signal for any interaction point along the long axis of a crystal pair; 3) the multiple interactions of a gamma ray within the array (e.g., Compton—Photoelectric interaction pair), and; 4) for row column summing, the impact of scattering within the detector array on the measured response functions along each row and column.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A scintillation detector for detecting the position of gamma photon interactions, comprising:

a plurality of substantially identical scintillation crystal bars arranged in a side-by-side relationship so as to define an array of conjunct scintillation crystal bar pairs, wherein each conjunct scintillation crystal bar pair is optically isolated from one another, and wherein each conjunct scintillation crystal bar pair is composed of two individual optically coupled scintillation crystal bars positioned in a side-by-side relationship, wherein each conjunct scintillation crystal bar pair includes (i) an optical interface layer positioned between and in contact with the two scintillation crystal bars for light sharing between one scintillation crystal bar and the other, and (ii) an opaque layer positioned between and in contact with the two scintillation crystal bars for restricting light sharing between one scintillation crystal bar and the other, wherein the optical interface layer and the opaque layer are contiguous with each other, wherein the optical interface layer and the opaque layer, in combination, of each conjunct scintillation crystal bar pair is substantially identical with the optical interface layer and the opaque layer, in combination, of each of the other conjunct scintillation crystal bar pairs, wherein each individual scintillation crystal bar includes proximal and distal ends, and wherein each proximal end includes an output window; and a solid-state semiconductor photodetector optically coupled to each output window of each individual scintillation crystal bar, wherein the solid-state semiconductor photodetector includes an array of discrete sensitive areas disposed across a top surface of a common substrate, and wherein each sensitive area contains an array of discrete micro-pixelated avalanche photodiodes, and wherein the output window of each scintillation crystal bar of the array of conjunct scintillation crystal bar pairs is optically coupled to each respective sensitive area of the array of discrete sensitive areas in a one-on-one relationship.

2. The scintillation detector of claim 1 wherein the optical interface layer is non-uniform.

3. The scintillation detector of claim 1 wherein the opaque layer is reflective.

4. The scintillation detector of claim 3 wherein the opaque layer includes a polymer reflective film or a reflective foil.

5. The scintillation detector of claim 1 wherein the opaque layer includes (i) a triangular shaped reflector having a base portion positioned adjacent to the proximal ends of each individual scintillation crystal bar, (ii) a rectangular shaped reflector having a base portion positioned adjacent to the proximal ends of each individual scintillation crystal bar, or (iii) a trapezoidal shaped reflector having a base portion positioned adjacent to the proximal ends of each individual scintillation crystal bar.

6. The scintillation detector of claim 1, further comprising a reflector layer disposed about the unshared surfaces of each conjunct scintillation crystal bar pair.

7. The scintillation detector of claim 1 wherein each individual scintillation crystal bar has a decay time ranging from about 20 ns to about 50 ns.

8. The scintillation detector of claim 1 wherein each individual scintillation crystal bar is selected from the group consisting of a LFS crystal, a LSO crystal, a LYSO crystal, a GSO crystal, a LGSO crystal, a LuAP crystal, a BGO crystal, a NaI crystal, and a $PbWO_4$ crystal.

9. The scintillation detector of claim 1 wherein the pixel density of each sensitive area is about or greater than 520 $pixel/mm^2$.

10. The scintillation detector of claim 1 wherein the pixel density of each sensitive area is about or greater than 1,100 $pixel/mm^2$.

11. The scintillation detector of claim 1 wherein the pixel density of each sensitive area is about or greater than 15,000 $pixel/mm^2$.

12. The scintillation detector of claim 1 wherein the pixel density of each sensitive area is about or greater than 40,000 $pixel/mm^2$.

13. The scintillation detector of claim 1 wherein the array of discrete sensitive areas of the solid state photodetector defines a flat surface.

14. The scintillation detector of claim 1 wherein the common substrate is crystalline or amorphous silicon.

* * * * *